US011676363B2

(12) United States Patent
Jęda et al.

(10) Patent No.: US 11,676,363 B2
(45) Date of Patent: Jun. 13, 2023

(54) ENHANCED DIGITAL IMAGE LOADING

(71) Applicant: International Business Machines Corporation, Armonk, NY (US)

(72) Inventors: Łukasz Tomasz Jęda, Cracow (PL); Jacek Midura, Zabierzow (PL); Adam Babol, Lubartow (PL); Andrzej Pietrzak, Podleze (PL)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 17/027,868

(22) Filed: Sep. 22, 2020

(65) Prior Publication Data
US 2022/0092329 A1 Mar. 24, 2022

(51) Int. Cl.
*G06V 10/44* (2022.01)
*G06F 16/583* (2019.01)
*G06N 3/08* (2023.01)
*G06T 7/73* (2017.01)
*G06F 16/51* (2019.01)

(52) U.S. Cl.
CPC ............. *G06V 10/44* (2022.01); *G06F 16/51* (2019.01); *G06F 16/583* (2019.01); *G06N 3/08* (2013.01); *G06T 7/73* (2017.01); *G06T 2207/30242* (2013.01)

(58) Field of Classification Search
CPC . G06V 10/44; G06T 7/73; G06T 2207/30242; G06F 16/583; G06F 16/51; G06N 3/08
See application file for complete search history.

(56) References Cited

U.S. PATENT DOCUMENTS

| 2003/0235338 A1* | 12/2003 | Dye .................... G06T 9/00 382/248 |
| 2014/0344663 A1 | 11/2014 | Joel et al. |
| 2017/0228937 A1 | 8/2017 | Murphy et al. |
| 2019/0342491 A1* | 11/2019 | Mandavilli ........ H04N 5/23219 |

OTHER PUBLICATIONS

Wainstein, "Reasons Images are Slowing Down Your Page Load Time (and How to Make it Better)", Snipcart, Published Date: Jun. 20, 2018, 8 pages. https://snipcart.com/blog/images-optimization-page-load-time.
"Semantically controlled inhomogeneous image resolution". An IP.com Prior Art Database Technical Disclosure, Published Date: Dec. 7, 2012, IP.com No. IPCOM000224091D, 6 pages.

(Continued)

*Primary Examiner* — Ruiping Li
(74) *Attorney, Agent, or Firm* — Mark Bergner

(57) ABSTRACT

A digital image is stored on a server. One or more areas of interest are determined within the digital image. One or more sets of features for each of the one or more areas of interest within the digital image are extracted. The digital image is parsed into a set of image layers, wherein a subset of image layers is associated with a first set of features of the one or more sets of features. A request to download the image from the server is received from a client. The subset of image layers is sent to the client. In response to sending the subset, the remainder of the set of images is sent.

20 Claims, 8 Drawing Sheets

(56) References Cited

OTHER PUBLICATIONS

Bruni, "Three Popular and Efficient Ways for Loading Images", Cloudinary Blog, Published Date: Mar. 6, 2017, 12 pages. https://cloudinary.com/blog/image_loading_reloaded.

Morelli, "5 steps to speed up your image heavy website", codeburt.io, Published Date: Jul. 25, 2018, 10 pages. https://codeburst.io/5-steps-to-speed-up-your-image-heavy-website-65c874a86966.

Mell et al., "The NIST Definition of Cloud Computing", Recommendations of the National Institute of Standards and Technology, Special Publication 800-145, Sep. 2011, 7 pages.

* cited by examiner

ENHANCED DIGITAL IMAGE LOADING

BACKGROUND

The present disclosure relates generally to the field of media transfers, and more particularly to loading digital images.

Loading or otherwise transferring digital images can burden computer networks and stress bandwidth resources. As digital media and images continue to increase in quality, and therefore file size, resource consumption increases.

SUMMARY

Embodiments of the present disclosure include a method, computer program product, and system for loading digital images.

A digital image is stored on a server. One or more areas of interest are determined within the digital image. One or more sets of features for each of the one or more areas of interest within the digital image are extracted. The digital image is parsed into a set of image layers, wherein a subset of image layers is associated with a first set of features of the one or more sets of features. A request to download the image from the server is received from a client. The subset of image layers is sent to the client. In response to sending the subset, the remainder of the set of image layers is sent.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
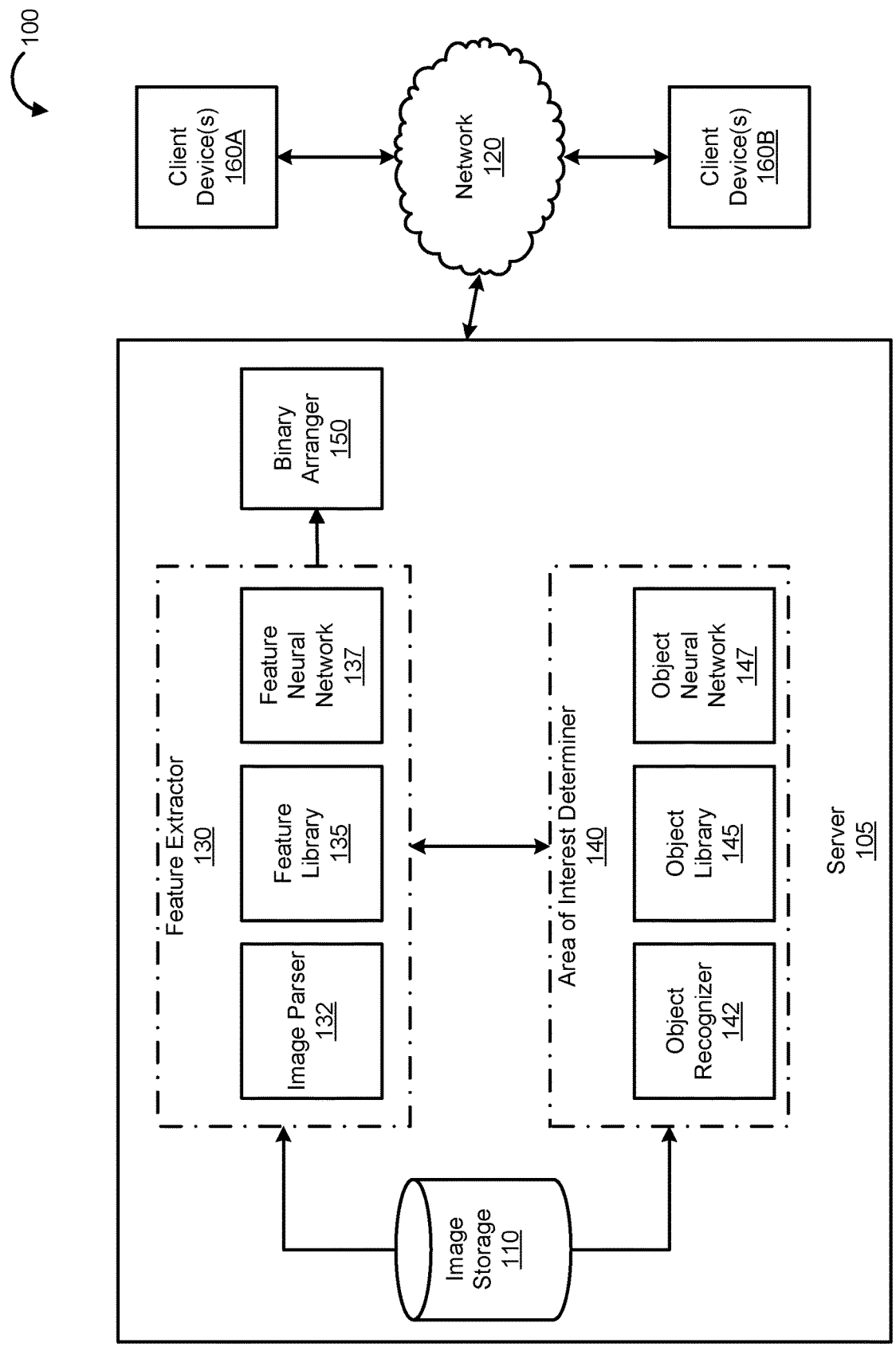
FIG. 1 illustrates an example network environment for loading images, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of media transfers, and more particularly to loading digital images. While the present disclosure is not necessarily limited to such applications, various aspects of the disclosure may be appreciated through a discussion of various examples using this context.

Computer networks, and especially the Internet, are used to share information. A significant amount of this information is embodied in the form of media, such as audio, video, and image files. As technology advances, the quality and file size of the media improves and increases. In several circumstances, this may lead to noticeable loading times and a degree of inefficiency when media is sent to a device which already stores a copy of that particular media.

Embodiments of the present disclosure contemplate techniques for enhancing the display and/or download of digital images by focusing on recognizable objects and features within an image and prioritizing them during the download and/or display process. In some embodiments, this may allow a user to view the most important aspects of an image sooner than if the entire image were to load at once. In some embodiments, the download of an image may be better managed during a progressive loading of the image data, such that the overall loading time may be reduced. In yet other embodiments, the loading time may be increased in order to better conserve and preserve computing resources and network bandwidth (e.g., avoiding the use of a bottleneck server to optimize network functionality across a plurality of users), yet the loading time of the areas of interest will be the same or decreased comparing to the standard way of loading the whole image at once.

Discussed herein are certain techniques that may decrease the loading time, at least for prioritized portions, of digital images. The original image size is, traditionally, a difficult obstacle to handle, especially in the case of high-resolution images. In such cases, the image may be loaded in stages. For example, a thumbnail or low-resolution clone of the image may first be loaded, then supplemented or replaced with additional image data to produce a higher resolution image. This may be repeated until enough image data is received to display the original, high-resolution image.

In some embodiments, interlacing techniques (e.g., loading the pixels of the image in sequence, such as top-to-bottom and/or left-to-right) may be used to load the digital image. For example, an image could be converted into a binary representation of the pixel data, and the pixels associated with any areas of interest (e.g., important objects, features, etc.) may be repositioned to the beginning of the binary representation, along with any information regarding pixel position, such that the pixels for the areas of interest may be loaded first.

In some embodiments, progressive image loading may be used. For example, the digital image may be parsed into image layers, where each layer contains the pixels for one or more areas of interest, one or more objects, one or more features, etc. In this way, the image layers may be applied/overlaid upon each other in sequence until the full original image is displayed.

In some embodiments, the criteria for determining an area of interest may include, for example, an evaluation of the number, type, and quality of recognized objects and/or features within a subsection of the image. Image subsections may be predetermined, or they may be determined based on logical distance and clustering metrics.

In some embodiments, certain classes of objects/features may be assigned priority over others. For example, letters/numbers may be given a relatively high priority (e.g., to allow a user to view/read the text/number), natural objects (e.g., trees, mountains, lakes) and/or buildings may be given a relatively low priority, as they may be associated with background/scenery, and people (e.g., faces, crowds, posed clothing) may be given the highest priority, as individuals are often the main subject of images/photographs (e.g., in vacation photos, family photos, etc.). In some embodiments, classes of objects may have sub-classes (e.g., object features), and features may also be divided into subclasses to fine-tune a priority scheme.

Using the techniques discussed herein, the digital image loading experience may be enhanced, not only to conserve and optimize resource utilization, but also to promote an enhanced viewing experience for the user. For example, using these techniques, the most interesting sections of a digital image (e.g., people, landmarks, signs, pets, etc.) may be loaded prior to background content (e.g., backdrops, common buildings, blurry objects, etc.) allowing a user to more quickly see the main subject(s) of the digital image.

In some embodiments, only a portion of the digital image may be loaded for a user to view, where the portion may include the areas of interest and/or objects that meet a priority threshold, whether that threshold is absolute (e.g., criteria/priority score of X or better) or relative (e.g., criteria/priority score of a particular object/area/feature is in the upper $30^{th}$ percentile of all objects/areas/features within the image). In this way, network resources may be conserved and loading times reduced while still allowing the user to view a substantial portion of the image.

Referring now to FIG. 1, illustrated is an example network environment 100 for loading images, in accordance with embodiments of the present disclosure. Example network environment 100 may include, for example, server 105, network 120, and client devices 160A-B. In some embodiments, certain functions of client devices 160A-B and server 105 may be implemented at a location different from the depiction.

According to embodiments, the server 105 and the client devices 160A-B may be computer systems (e.g., may contain the same or similar components as computer system 701). The client devices 160A-B and the server 105 may be configured to communicate with each other through an internal or external network interface (not shown). The network interfaces may be, e.g., modems, wireless network adapters, Ethernet adapters, etc. The client devices 160A-B and/or the server 105 may be further equipped with a display or monitor (not shown). Additionally, the client devices 160A-B and/or the server 105 may include optional input devices (e.g., a keyboard, mouse, scanner, or other input device), and/or any commercially available or custom software (e.g., image processing software, object identification software, etc.). In some embodiments, the client devices 160A-B and/or the server 105 may be servers, desktops, laptops, or hand-held devices.

Client devices 160A-B and server 105 may further include storage (e.g., image storage 110). Image storage 110 may include, for example, virtualized disk drives, physical hard disk drives, solid state storage drives, or any other suitable storage media. In some embodiments, media, images, object identifications, features, image layers, etc., as well as metadata may be stored, temporarily or permanently, using image storage 110.

The client devices 160A-B and the server 105 may be distant from each other and may communicate over a network 120. In embodiments, the server 105 may be a central hub from which client devices 160A-B and other remote devices (not pictured) can establish a communication connection, such as in a client-server networking model. In some embodiments, the server 105 and client devices 160A-B may be configured in any other suitable network relationship (e.g., in a peer-to-peer configuration or using another network topology).

In embodiments, the network 120 can be implemented using any number of any suitable communications media. For example, the network 120 may be a wide area network (WAN), a local area network (LAN), the Internet, or an intranet. In certain embodiments, the client devices 160A-B and the server 105 may be local to each other and communicate via any appropriate local communication medium. For example, the client devices 160A-B and the server 105 may communicate using a local area network (LAN), one or more hardwire connections, a wireless link or router, or an intranet. In some embodiments, client devices 160A-B and the server 105, and any other devices may be communicatively coupled using a combination of one or more networks and/or one or more local connections. For example, the client devices 160A-B may be hardwired to the server 105 (e.g., connected with an Ethernet cable) while a third client device (not pictured) may communicate with the host device using the network 120 (e.g., over the Internet).

In some embodiments, the network 120 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 120.

Server 105 may contain or include, according to embodiments, image storage 110, feature extractor 130, area of interest determiner 140, and binary arranger 150. Image storage 110 may include, as discussed herein, any suitable type of physical or virtual storage media suitable for storing digital images and any associated data or metadata, such as image layers, feature data, object recognition data, etc. In some embodiments, object library 145 and/or feature library 135 may be contained within image storage 110. In some embodiments, analog images (e.g., photographs, lithographs, daguerreotypes, etc.) may be scanned, imaged, or otherwise converted into digital images and stored in image storage 110.

Area of interest determiner 140 may include, in some embodiments, object recognizer 142, object library 145, and object neural network 147. Area of interest determiner may, either as a preprocessing step or in response to a request to download an image from server 105, receive/retrieve a digital image from image storage 110, and determine one or more areas of interest within the digital image. In some embodiments, this may include recognizing the number, type, quality, spatial relationship, and other characteristics/attributes of the various objects represented in the digital image. In some embodiments, objects within the digital image may be identified/determined by comparing a library of objects (e.g., object library 145) to the digital image via an object recognizer 142. Object recognizer 142 may operate, in some embodiments, on a rules-based system, or it may leverage, at least in part, object neural network 147 to perform object recognition techniques using machine learning and/or other neural networking techniques. Further detail regarding the operation and function of neural networks is given with regards to FIG. 4.

In some embodiments, once object recognizer 142 has identified/determined the objects within the digital image, the area of interest determiner may use this data to generate and/or determine one or more areas of interest within the digital image. In some embodiments, area of interest determiner 140 may share this data and information with feature extractor 130. In other embodiments, feature extractor 130 may receive/retrieve the same digital image from image storage 110.

Feature extractor 130 may include, in some embodiments, and image parser 132, a feature library 135, and a feature neural network 137. In some embodiments, features may be considered a subclass of an object, or features may be considered details/facets/aspects of an object. For example, a billboard in a digital image may be recognized as an object, and the text written thereon may be considered a feature of the object. As another example, a dog may be recognized as an object, and characteristics of the dog may be considered features; such features may further lead to a better identification of the dog (e.g., German shepherd, poodle, beagle, etc.), which may allow the areas of interest/objects/features to be better prioritized. As an example, an individual appearing on a billboard within a digital image may be associated with features (e.g., 2D characteristics, exaggerated expressions, etc.) that lower the priority of the individual appearing on billboard, whereas "live" individuals within the image may be associated with features (e.g., 3D characteristics, side-facing profiles, environmental interactions, etc.) that increase the priority of the "live" individuals. In this way, the features of objects within the digital image may be leveraged to distinguish among similar objects, and prioritize them (and subsequently the areas of interest within the digital image) accordingly when loading the image.

In some embodiments, feature library 135 may include a corpus of features associated with objects, such as the objects stored within object library 145. In some embodiments, the features in feature library 135 may be applied in a rules-based fashion, or they may include features identified by feature neural network 137. In some embodiments, data from area of interest determiner 140 (e.g., the number, type, etc. of objects) may be used by feature extractor 130 to determine which features are present and/or which features may correlate with priority. Likewise, data from feature extractor 130 may be used to facilitate the recognition of objects and/or areas of interest by area of interest determiner 140.

In some embodiments, image parser 132 may be contained within feature extractor 130, or it may be a standalone component within server 130. Image parser 132 may parse a digital image into image layers, as discussed herein.

In embodiments where interlacing is contemplated and/or employed, a binary arranger 150 may receive/retrieve the preprocessed digital image. A preprocessed digital image may, but is not required to, have been parsed into image layers by image parser 132. Binary arranger 150 may convert the digital image into a binary representation, as discussed herein. Binary arranger 150 may further rearrange the binary sequence of the digital image, such that the data for the pixels associated with the features/objects/areas of interest within the digital image are repositioned/reordered to the beginning of the binary sequence, along with any necessary metadata (e.g., data regarding pixel location/placement within the digital image). In this way, a binary representation of the digital image may be streamed to one or more client devices 160A-B, and the areas of interest may be received and loaded in real time, as they are received and prior to other areas of the digital image that are associated with a lower priority compared to the areas of interest.

While FIG. 1 illustrates example network environment 100 with a single server 105 and two client devices 160A-B, suitable network environments for implementing embodiments of this disclosure may include any number of client devices and/or servers. The various models, modules, systems, and components illustrated in FIG. 1 may exist, if at all, across a plurality of devices. For example, some embodiments may include two client devices or two servers. The hypothetical two servers may be communicatively coupled using any suitable communications connection (e.g., using a WAN, a LAN, a wired connection, an intranet, or the Internet). The first server may include area of interest determiner 140, and the second server may include the feature extractor 130. In such embodiments, the various servers may communicate and act in concert to execute the functions of the disclosure.

It is noted that FIG. 1 is intended to depict the representative major components of an example network environment 100. In some embodiments, however, individual components may have greater or lesser complexity than as represented in FIG. 1; components other than or in addition to those shown in FIG. 1 may be present, and the number, type, and configuration of such components may vary.

Figure 2:
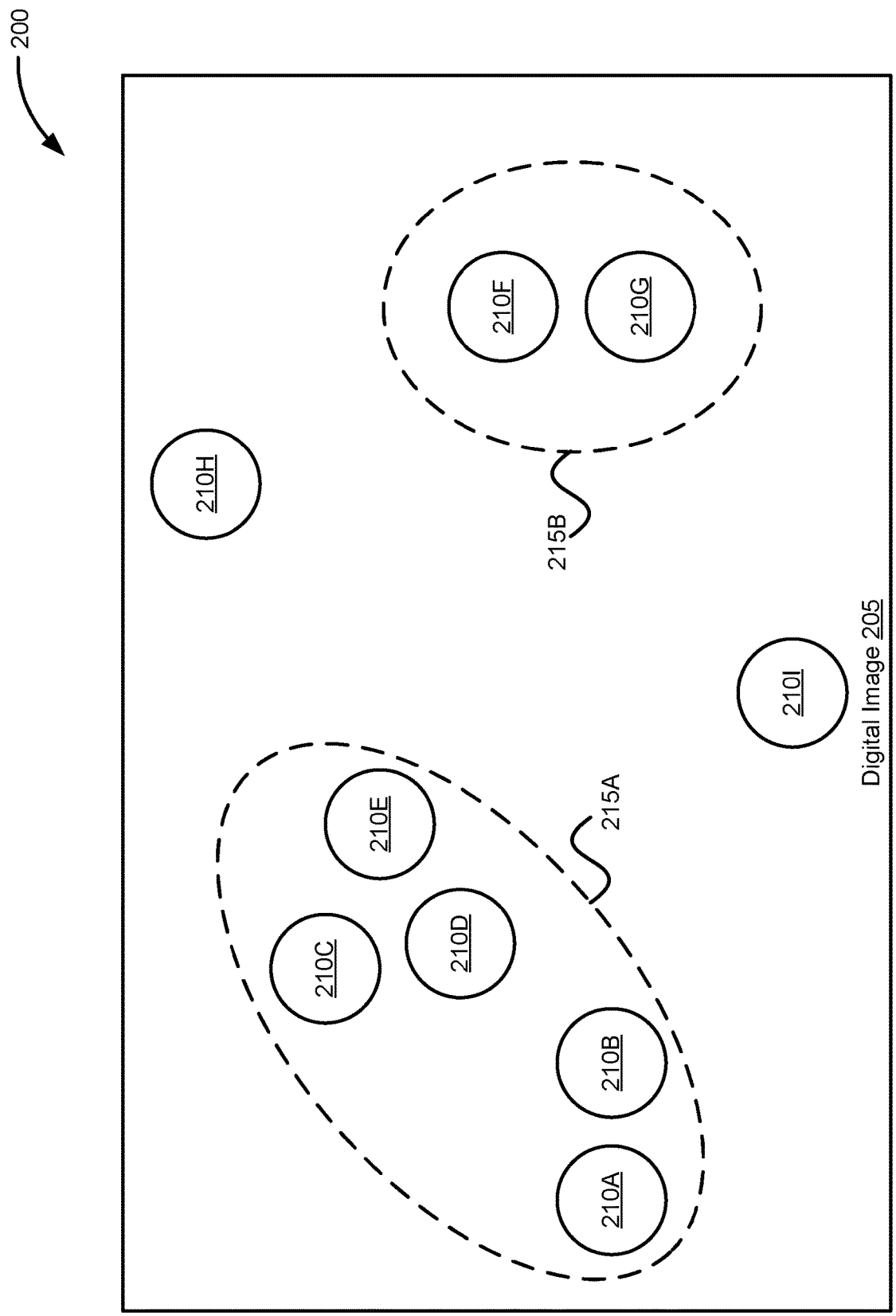
FIG. 2 illustrates an example image layout, in accordance with embodiments of the present disclosure.

Turning now to FIG. 2, illustrated is example image layout 200, in accordance with embodiments of the present disclosure. Example image layout 200 shows a digital image 205, which may include areas of interest 215A-B, and objects 210A-I.

Areas of interest 215A-B may be determined as discussed herein. For example, the number, type, quality, and spatial relationship of objects 210A-B (and these objects' features) may factor into the determination of which areas within the digital image 205 constitute an area of interest.

As an example, if digital image 205 were to depict a wedding scene, objects 210A-B could be the bride and groom, and objects 210C-E could be released doves in flight. The features of these objects (e.g., bridal dress, tuxedo, etc.), their spatial relationship, and their quality could all contribute to a determination that the area of 215A is an area of interest.

Further describing the wedding scene example, area of interest 215B may contain objects 210F-G, which may be prominent landmarks, statues, panes of a stained-glass window of a church, etc., and may therefore provide a sufficient quality-factor to designate 215B as an area of interest. Objects 210H-I may, for example, be an airplane and a squirrel, respectively, and may therefore be assigned a low priority, or otherwise be excluded from inclusion in any area of interest, either due to low quality (e.g., being unrelated to anything else in digital image 205) or due to spatial distance (e.g., being far from all other objects and/or areas of interest).

Figure 3A:
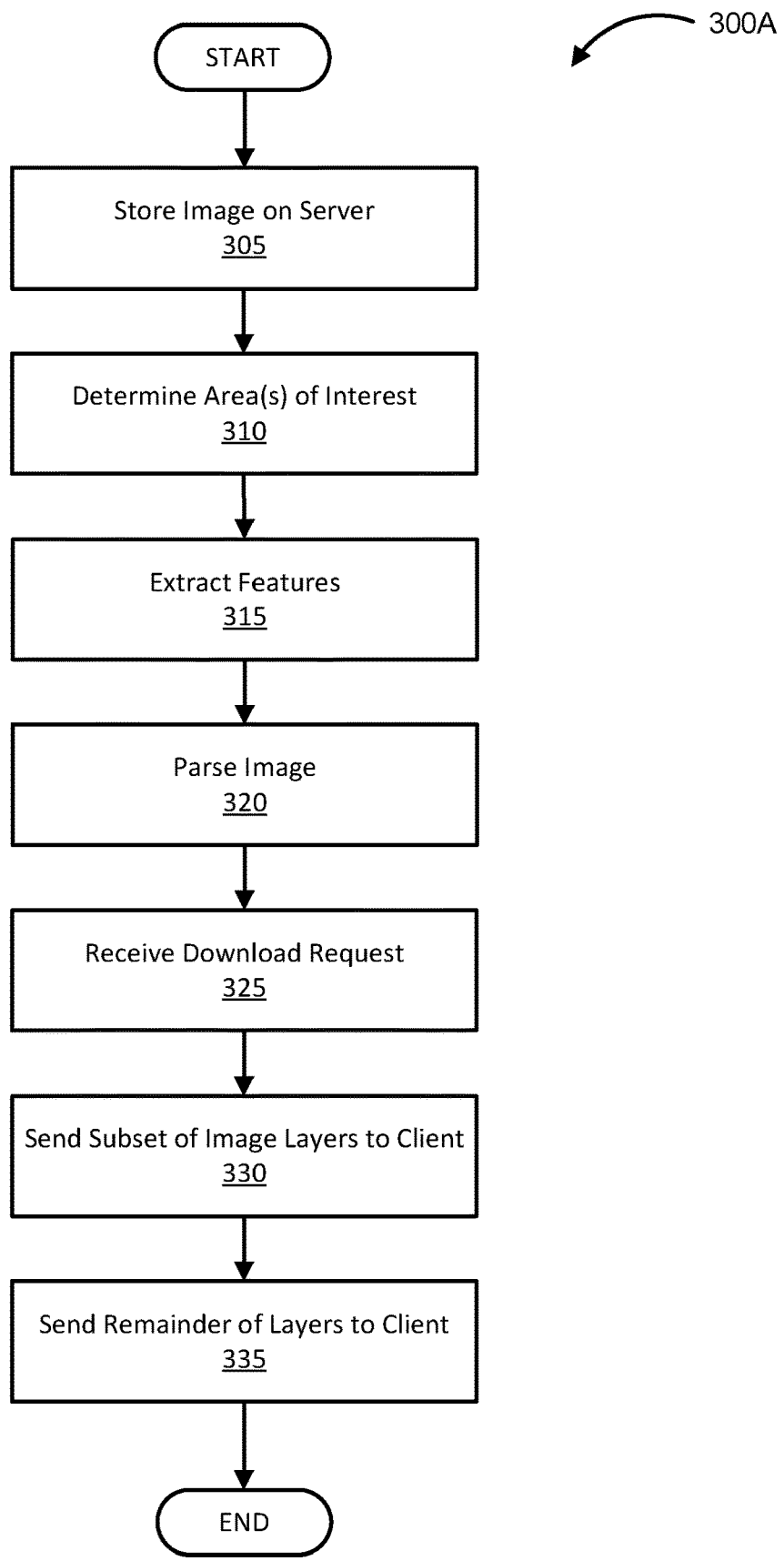
FIG. 3A illustrates an example method for loading images, in accordance with embodiments of the present disclosure.

Turning now to FIG. 3A, depicted is an example method 300A for loading images, in accordance with embodiments of the present disclosure. Example method 300A may begin at 305, where a digital image is stored on a server (e.g., in image storage 110 of server 105).

At 310, one or more areas of interest within the digital image are determined, as described herein. Determining an area of interest may include performing object recognition techniques to identify any objects within an image, and may consider the number, type, quality, and spatial relationship of those objects, as described herein.

At 315, one or more sets of features for each area of interest may be extracted. In some embodiments, this may include extracting characteristics and/or subsections of the objects within the areas of interest. For example, if an area of interest is determined to be a vehicle, objects within the area of interest may include people, luggage, pets, and vehicle parts. Extracted features may include characteristics to distinguish among a cab driver and passengers, distinguish among pet type/breeds, identify lettering of a brand name of the vehicle and/or luggage, etc.

At 320, the digital image may be parsed into a set of image layers, where a subset of the image layers is associated with a first set of features. For example, if a first set of features is associated with a poodle, the digital image may be parsed such that the poodle is isolated into its own image layer. In some embodiments, each image layer may be assigned a priority, according to the content of the image layer. In some embodiments, the subset may include the highest-priority image layer or a group of high-priority image layers.

At 325, a download request is received from a client to download the digital image. This may occur over network 120, and may be initiated by any properly-authorized client device (e.g., client devices 160A-B).

At 330, the subset of image layers is sent to the client. At this point, the client device may, independently from the server, display the subset of image layers to a user, as described herein. In this way, a user may view the highest-priority image layer(s) as soon as possible.

At 335, the remainder of the set of image layers is sent, in response to the sending of the subset of image layers. In this way, the remainder of the digital image (e.g., the lower-priority image layers) may be supplied to the client device and combined with the higher-priority image layers to complete the digital image. In this way, a user may view the entirety of the digital image, if desired.

Figure 3B:
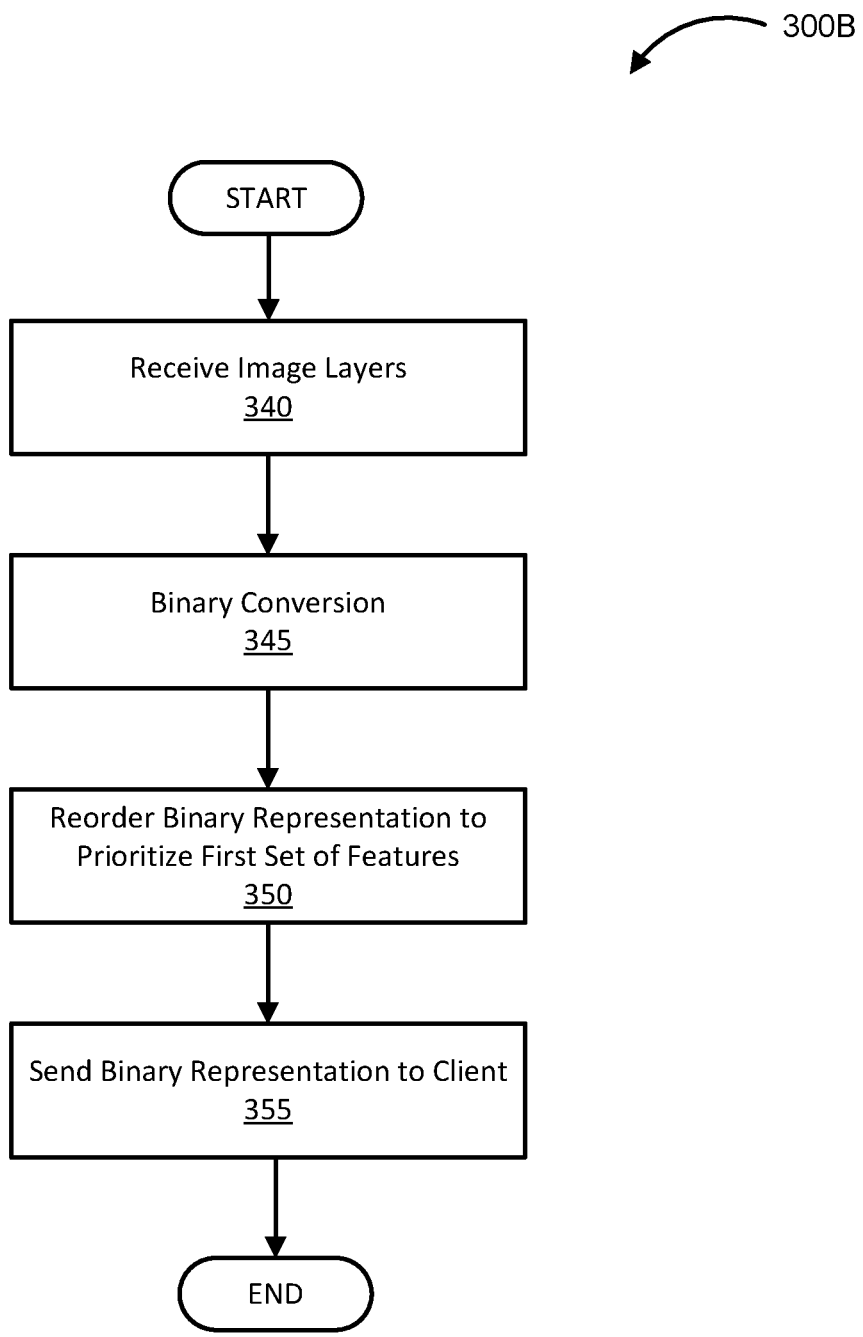
FIG. 3B illustrates an example method for binary reordering for image loading, in accordance with embodiments of the present disclosure.

Turning now to FIG. 3B, illustrated is an example method 300B for binary reordering for image loading, in accordance with embodiments of the present disclosure. Example method 300B may begin at 340, where the image layers of a digital image are received.

At 345, the image layers are converted into binary representations such that interlacing techniques may be employed, as described herein.

At 350, the binary representation of the digital image may be reordered, such that the image layers associated with a high priority may be set to the beginning of the binary representation, along with any necessary metadata to ensure the pixels are properly positioned within the image as the binary representation is processed for display.

At 355, the reordered binary representation may be sent to a client, and the client device may display the digital image to the user, as described herein. In such embodiments, the binary representation may be streamed to the client device and loaded on the fly, which the image layers with the highest priority loading first.

One having skill in the art will recognize that, in some embodiments, the digital image need not be pre-processed and parsed into layers. Rather, the areas of interest, objects, and features within the digital image may be identified/determined, and the parsing of the image into layers may be omitted, in some of the embodiments where interlacing/binary representations are utilized. For example, the entire digital image may be converted into a binary representation, and all the areas within the digital image may be reorder/prioritized within the binary representation and streamed to a client device, without the need for image layer parsing. In such embodiments, step 340 may rather indicate the receipt of the entire digital image, as opposed to the image layers of the digital image.

Figure 4:
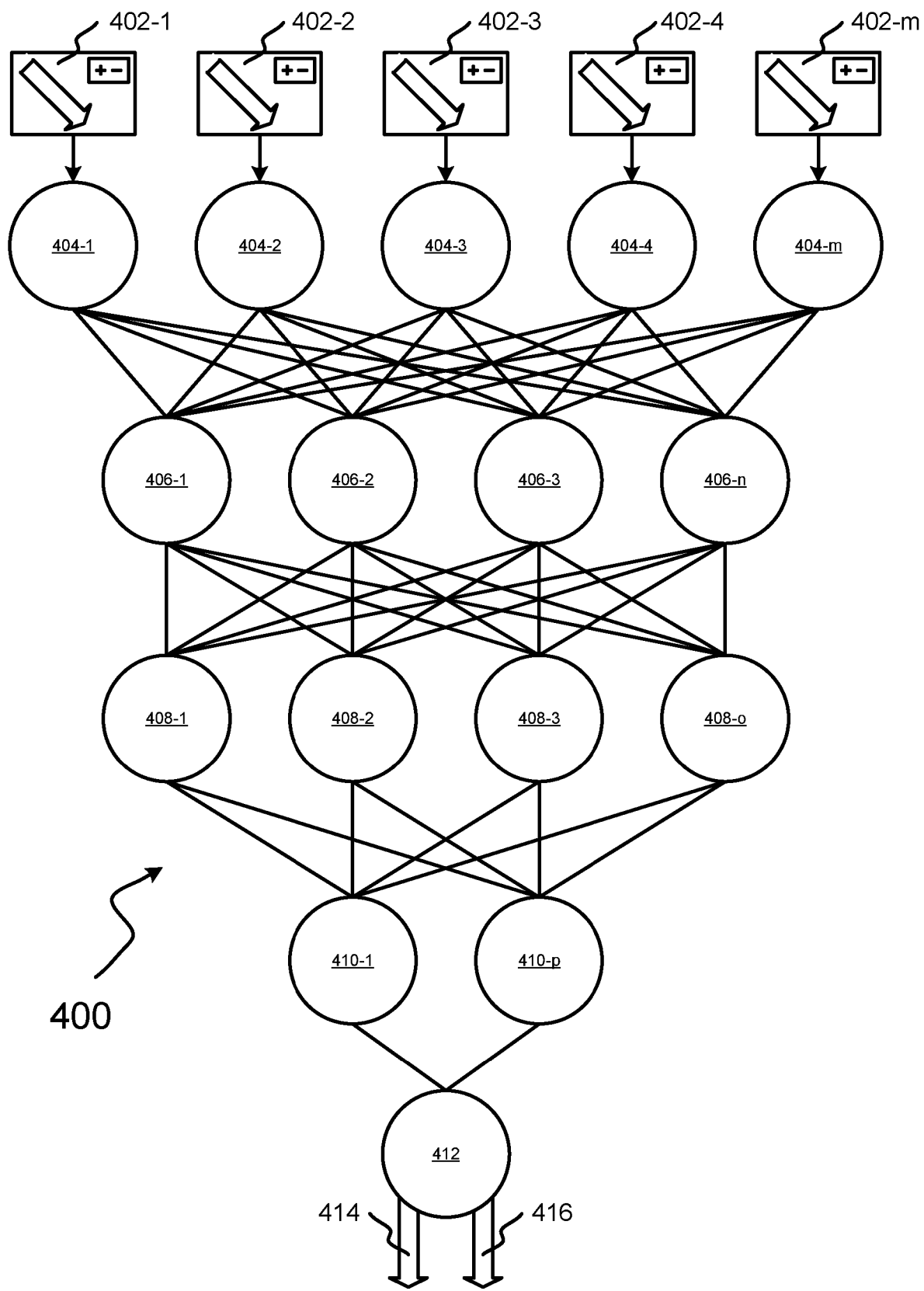
FIG. 4 illustrates an example neural network for performing object recognition and feature extraction, in accordance with embodiments of the present disclosure.

FIG. 4 depicts an example neural network 400 that may be used to perform object recognition and feature extraction, in accordance with embodiments of the present disclosure. The example neural network 400 may be implemented as part of a system for loading digital images (e.g., server 105), in some embodiments. In some embodiments, parallel techniques (e.g., Single Instruction Multiple Data (SIMD) techniques) may be employed to concurrently adjust multiple neural network edges (e.g., within feature neural network 137 or object neural network 147).

In embodiments, neural network 400 may be a classifier-type neural network. Neural network 400 may be part of a larger neural network (e.g., may be a sub-unit of a larger neural network). For example, neural network 400 may be nested within a single, larger neural network, connected to several other neural networks, or connected to several other neural networks as part of an overall aggregate neural network.

Inputs 402-1 through 402-$m$ represent the inputs to neural network 400. In this embodiment, 402-1 through 402-$m$ do not represent different inputs. Rather, 402-1 through 402-$m$ represent the same input that is sent to each first-layer neuron (neurons 404-1 through 404-$m$) in neural network 400. In some embodiments, the number of inputs 402-1 through 402-$m$ (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-$m$ may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-$m$ may comprise one or more samples of classifiable data. For example, inputs 402-1 through 402-$m$ may comprise 10 samples of classifiable data. In other embodiments, not all samples of classifiable data may be input into neural network 400.

Neural network 400 may comprise 5 layers of neurons (referred to as layers 404, 406, 408, 410, and 412, respectively corresponding to illustrated nodes 404-1 to 404-$m$, nodes 406-1 to 406-$n$, nodes 408-1 to 408-$o$, nodes 410-1 to 410-$p$, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur and contains only one neuron (neuron 412). In other embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the activation function. For example, layer 404 may be a "dropout" layer, which may process the input of the previous layer (here, the inputs) with some neurons removed from processing. This may help to average the data and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-$m$) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other embodiments, any of layers 404 through 410 may be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

In embodiments, FIG. 4 illustrates an example probability-generator neural network with one pattern-recognizer pathway (e.g., a pathway of neurons that processes one set of inputs and analyzes those inputs based on recognized patterns and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well. This merger may increase the ability to identify correlations in the patterns identified among different inputs, as well as eliminate data that does not appear to be relevant.

In embodiments, neural network 400 may be trained/adjusted (e.g., biases and weights among nodes may be calibrated) by inputting feedback and/or input to correct/force the neural network to arrive at an expected output (e.g., using object library 145 or feature library 135, as appropriate). In some embodiments, the feedback may be forced selectively to particular nodes and/or sub-units of the neural network. In some embodiments, the impact of the feedback on the weights and biases may lessen over time, in order to correct for inconsistencies among user(s) and/or datasets. In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
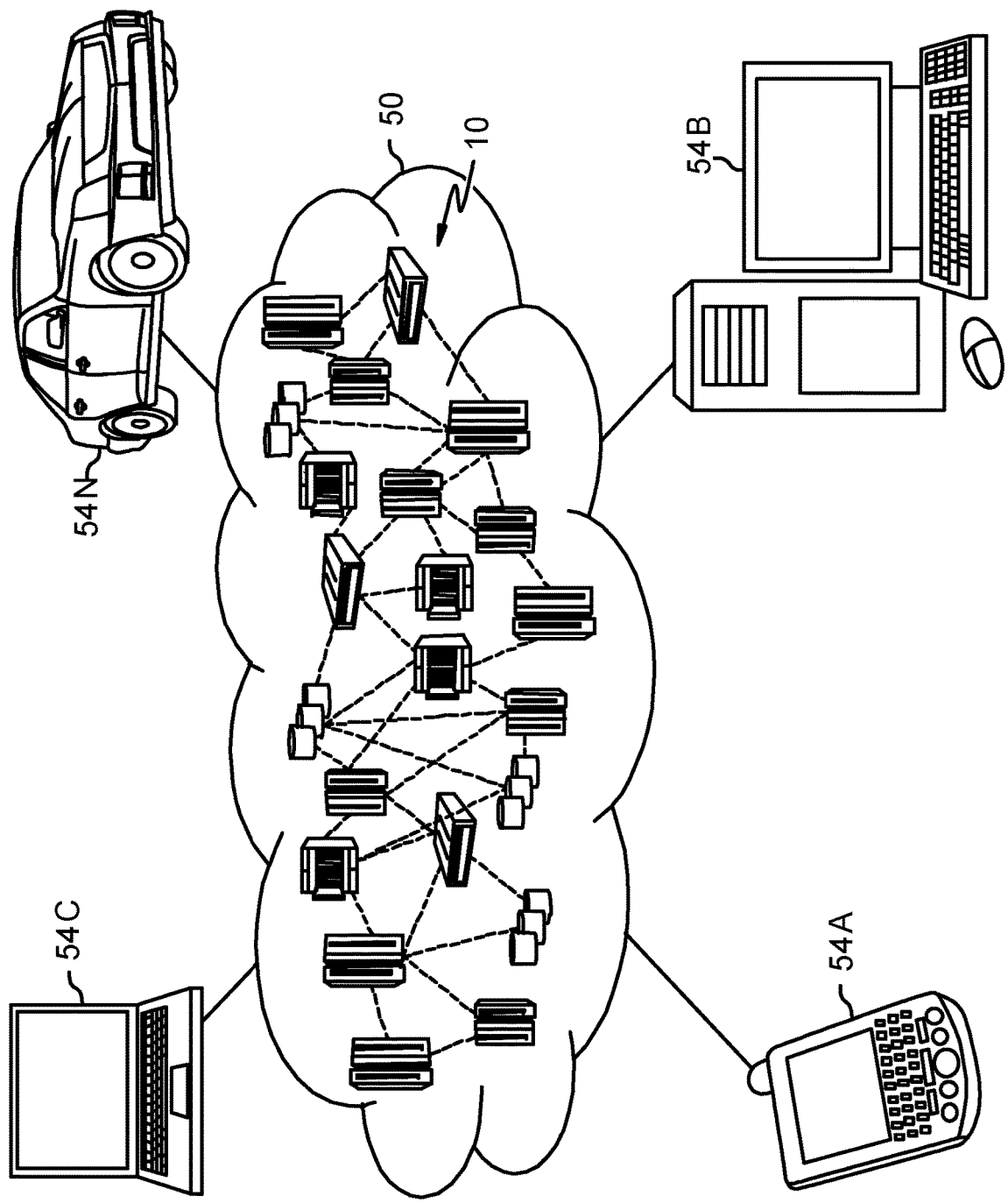
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
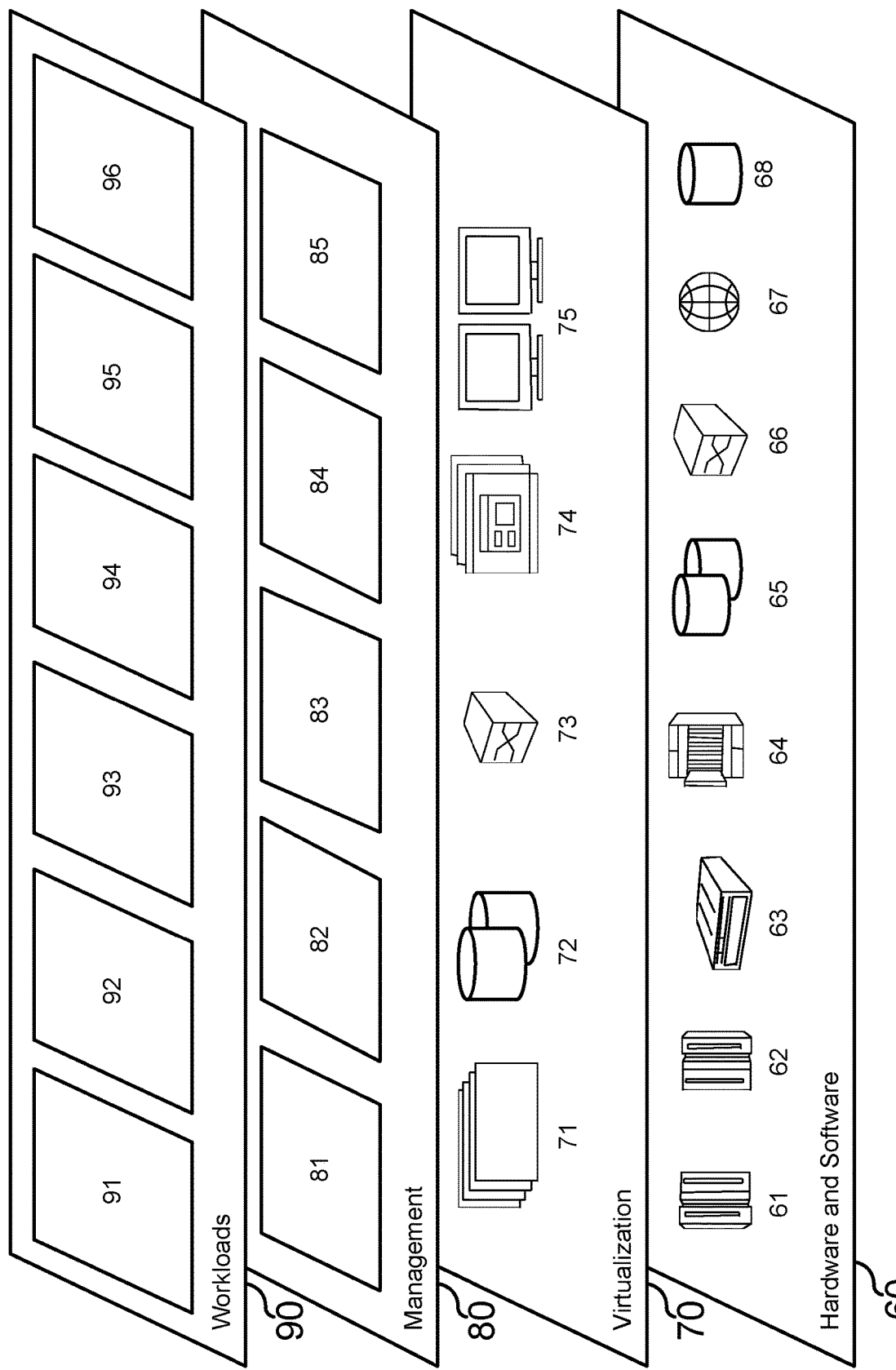
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and loading digital images 96.

Figure 7:
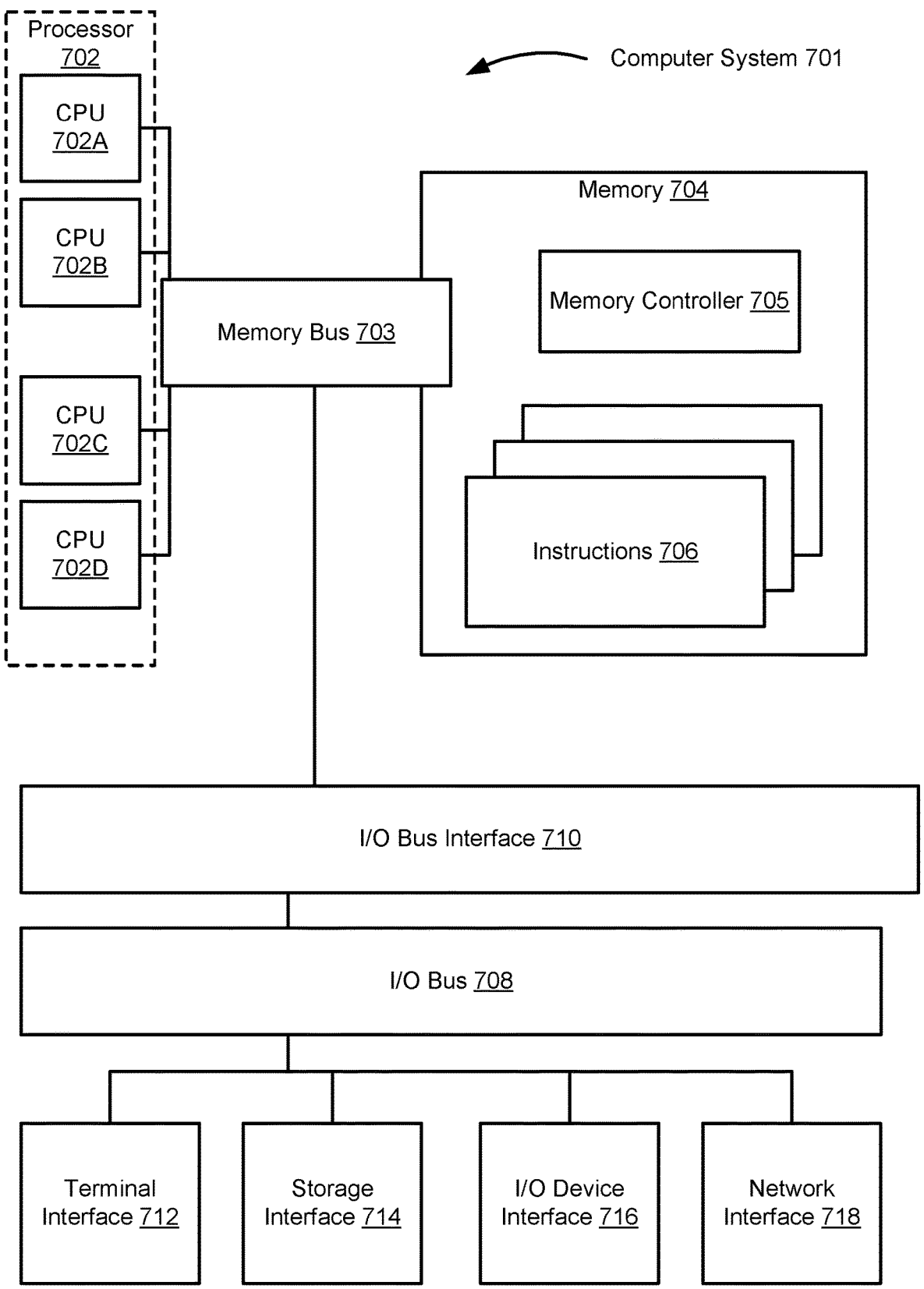
FIG. 7 depicts a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 300A-B, described in FIGS. 3A and 3B. The example computer system 701 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 701 comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache. Memory subsystem 704 may include instructions 706 which, when executed by processor 702, cause processor 702 to perform some or all of the functionality described above with respect to FIGS. 3A and 3B.

In some embodiments, the memory subsystem 704 may comprise a random-access semiconductor memory, storage device, or storage medium (either volatile or non-volatile)

for storing data and programs. In some embodiments, the memory subsystem 704 may represent the entire virtual memory of the computer system 701 and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative example components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for loading a digital image, the method comprising:
    storing, on a server, the digital image;
    determining one or more areas of interest within the digital image;
    extracting one or more sets of features for each of the one or more areas of interest within the digital image;
    parsing the digital image into a set of image layers, wherein:
        a highest priority proper subset of image layers is associated with a first set of features of the one or more sets of features, the first set of features comprising people or pet;
        a high priority proper subset of image layers is associated with a second set of features of the one or more sets of features, the second set of features comprising letters and numbers; and
        a low priority proper subset of image layers is associated with a third set of features of the one or more sets of features, the third set of features comprising natural objects, buildings, backdrops, or blurry objects; and
    receiving, from a client, a request to download the image from the server;
    sending, to the client, the highest priority proper subset of image layers;
    after sending the highest priority proper subset of image layers, sending the high priority proper subset of image layers; and
    after sending the high priority proper subset of image layers, sending the low priority proper subset of image layers.

2. The method of claim 1, wherein:
    parsing the digital image into the set of image layers includes converting the digital image into a binary representation of the digital image;
    a subset of the binary representation is associated with the subset of image layers, and the subset of the binary representation is repositioned to the beginning of the binary representation; and
    in response to receiving the request, the binary representation is sent to the client.

3. The method of claim 1, wherein the one or more areas of interest are determined using object recognition techniques to determine a number and a quality for a set of objects within the digital image.

4. The method of claim 3, wherein the one or more areas of interest are further determined by comparing the number and the quality of the set of objects within the digital image to a set of criteria.

5. The method of claim 4, wherein the set of criteria considers at least the number, the quality, and a spatial relationship among the set of objects within the digital image.

6. The method of claim 5, wherein each set of features within the one or more sets of features corresponds to an object within the set of objects.

7. The method of claim 6, wherein the first set of features corresponds to a set of highest quality objects.

8. A computer program product for loading a digital image, the computer program product comprising a computer readable storage medium having program instructions embodied therewith, the program instructions executable by a device to cause the device to:
    store, on a server, the digital image;
    determine one or more areas of interest within the digital image;
    extract one or more sets of features for each of the one or more areas of interest within the digital image;
    parse the digital image into a set of image layers, wherein:

a highest priority proper subset of image layers is associated with a first set of features of the one or more sets of features, the first set of features comprising people or pet;

a high priority proper subset of image layers is associated with a second set of features of the one or more sets of features, the second set of features comprising letters and numbers; and a low priority proper subset of image layers is associated with a third set of features of the one or more sets of features, the third set of features comprising natural objects, buildings, backdrops, or blurry objects; and receive, from a client, a request to download the image from the server;

send, to the client, the highest priority proper subset of image layers;

after sending the highest priority proper subset of image layers, sending the high priority proper subset of image layers; and after sending the high priority proper subset of image layers, sending the low priority proper subset of image layers.

9. The computer program product of claim 8, wherein:

parsing the digital image into the set of image layers includes converting the digital image into a binary representation of the digital image;

a subset of the binary representation is associated with the subset of image layers, and the subset of the binary representation is repositioned to the beginning of the binary representation; and in response to receiving the request, the binary representation is sent to the client.

10. The computer program product of claim 8, wherein the one or more areas of interest are determined using object recognition techniques to determine a number and a quality for a set of objects within the digital image.

11. The computer program product of claim 10, wherein the one or more areas of interest are further determined by comparing the number and the quality of the set of objects within the digital image to a set of criteria.

12. The computer program product of claim 11, wherein the set of criteria considers at least the number, the quality, and a spatial relationship among the set of objects within the digital image.

13. The computer program product of claim 12, wherein each set of features within the one or more sets of features corresponds to an object within the set of objects.

14. The computer program product of claim 13, wherein the extraction of the one or more sets of features is performed using a neural network, and wherein the neural network is trained by adjusting a weight and a bias of at least one edge within the neural network.

15. A system for loading a digital image, the system comprising:

a memory subsystem, with program instructions included thereon; and a processor in communication with the memory subsystem, wherein the program instructions cause the processor to:

store, on a server, the digital image;

determine one or more areas of interest within the digital image;

extract one or more sets of features for each of the one or more areas of interest within the digital image;

parse the digital image into a set of image layers, wherein:

a highest priority proper subset of image layers is associated with a first set of features of the one or more sets of features, the first set of features comprising people or pet;

a high priority proper subset of image layers is associated with a second set of features of the one or more sets of features, the second set of features comprising letters and numbers; and a low priority proper subset of image layers is associated with a third set of features of the one or more sets of features, the third set of features comprising natural objects, buildings, backdrops, or blurry objects; and receive, from a client, a request to download the image from the server;

send, to the client, the highest priority proper subset of image layers;

after sending the highest priority proper subset of image layers, sending the high priority proper subset of image layers; and after sending the high priority proper subset of image layers, sending the low priority proper subset of image layers.

16. The system of claim 15, wherein:

parsing the digital image into the set of image layers includes converting the digital image into a binary representation of the digital image;

a subset of the binary representation is associated with the subset of image layers, and the subset of the binary representation is repositioned to the beginning of the binary representation; and in response to receiving the request, the binary representation is sent to the client.

17. The system of claim 15, wherein the one or more areas of interest are determined using object recognition techniques to determine a number and a quality for a set of objects within the digital image.

18. The system of claim 17, wherein the one or more areas of interest are further determined by comparing the number and the quality of the set of objects within the digital image to a set of criteria.

19. The system of claim 18, wherein the set of criteria considers at least the number, the quality, and a spatial relationship among the set of objects within the digital image.

20. The system of claim 19, wherein each set of features within the one or more sets of features corresponds to an object within the set of objects.

* * * * *